(12) United States Patent
Goldberg et al.

(10) Patent No.: US 12,457,117 B2  
(45) Date of Patent: Oct. 28, 2025

(54) SIGNATURE EXTRACTION AND VERIFICATION PER-FILE FOR DEBUGGING

(71) Applicant: Red Hat, Inc., Raleigh, NC (US)

(72) Inventors: Ryan Goldberg, Toronto (CA); Frank Eigler, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 235 days.

(21) Appl. No.: 18/305,301

(22) Filed: Apr. 21, 2023

(65) Prior Publication Data

US 2024/0356763 A1 Oct. 24, 2024

(51) Int. Cl.
  *H04L 29/00* (2006.01)
  *H04L 9/32* (2006.01)
(52) U.S. Cl.
  CPC .......... *H04L 9/3268* (2013.01); *H04L 9/3247* (2013.01)
(58) Field of Classification Search
  CPC ..................... H04L 9/3268; H04L 9/3247
  See application file for complete search history.

(56) References Cited

U.S. PATENT DOCUMENTS

| | | | | |
|---|---|---|---|---|
| 10,805,087 B1 * | 10/2020 | Allen | ...................... | G06F 21/57 |
| 2014/0289510 A1 * | 9/2014 | Tuch | ................... | G06F 21/6281 |
| | | | | 713/156 |
| 2015/0264077 A1 * | 9/2015 | Berger | ................... | G06F 21/51 |
| | | | | 726/23 |
| 2016/0082352 A1 * | 3/2016 | Oku | ........................ | A63F 13/35 |
| | | | | 463/29 |
| 2018/0302787 A1 * | 10/2018 | Boylan | ............... | H04L 63/0823 |
| 2019/0253251 A1 * | 8/2019 | Kobayashi | ........... | H04L 9/3247 |

* cited by examiner

*Primary Examiner* — Ghazal B Shehni
(74) *Attorney, Agent, or Firm* — Womble Bond Dickinson (US) LLP (57) ABSTRACT

Processing logic may send an HTTP request for a file to an HTTP server over a computer network. Processing logic may receive, from the HTTP server, a signature that is associated with the file, and the file. The file may include the source code that is associated with the file, executable code that corresponds to the source code, and debug data associated with the source code and the executable code. Processing logic compares the signature with the file using a digital verification certificate to validate the file. In response to the file being validated, processing logic accepts the file from the HTTP server.

20 Claims, 6 Drawing Sheets

SIGNATURE EXTRACTION AND VERIFICATION PER-FILE FOR DEBUGGING

TECHNICAL FIELD

Aspects of the present disclosure relate to debugging software, and more particularly, to receiving and validating debugging information to be used for debugging software.

BACKGROUND

Computing devices may execute instructions that are grouped together as a computer program to perform one or more related actions. Computing devices may be communicatively coupled to each other over a network, which may include electrical or optical wiring, wireless radio-frequency transceivers, or other network infrastructure. The computing devices may communicate with each other over the network, using a variety of communication protocols.

Developers may debug their software by stepping through the code. This debugging may be performed by simulating the execution of the software and observing the behavior of the software from the perspective of the human-readable code. Through debugging, a developer may monitor values of variables, the execution flow, or other aspects of the software to uncover potential vulnerabilities or unexpected behavior.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A debug server may provide a centralized system of distributing debugging resources for debugging software applications. This may allow developers and system administrators to obtain debug resources. Debug resources may include source code, executable code (which may be referred to as machine executable code, or a binary code), and debug data, which may map the source code to the executable code. For example, the debug data may include a set of symbols that are generated when a program is compiled that contains information about the location of variables and functions in the resulting binary file, and other service information if present. This debug data can be used for step-by-step debugging of the program or examining third-party code. The debug symbols may be especially helpful to debug issues that may occur in production environments, as it allows developers to trace the execution of their code and identify the root cause of a problem.

The debug server can be configured to use a variety of backends for storing and serving debug symbols, including hypertext transfer protocol (HTTP), hypertext transfer protocol secure (HTTPS), and remote sync (rsync) servers. Such a debug server may be particularly useful in containerized environments, where it can be challenging to distribute and manage debug symbols for applications that are running in multiple containers. By centralizing the distribution of debug symbols, developers may better debug their applications and diagnose issues that may be occurring in production environments.

In conventional systems, a user may operate a client device to communicate to a debug server to obtain debug resources for an entire application or data package such as an RPM package manager (RPM) package. The user, however, may wish to debug only a portion of the application, such as the file or files that the user is responsible developing. Thus, the user would have to download the entire data package to debug just that file, resulting in an inefficient use of time. Further, even if the user could obtain debug resources on a per-file basis, the user would not know if the debug resources for that file could be trusted.

Aspects of the disclosure address the above-noted issues and other deficiencies by requesting and receiving debug resources on a per-file basis. A file may be provided in response to a user request, with a signature of that file. The user may validate the file with the signature and a digital verification certificate, to ensure the integrity of the file. The file may include the debug data for a given source code file that maps that human-readable source code to the compiled version of the source code, which is the binary or executable code. In some examples, the file may include the source code file, the executable code, and the debug data.

In one aspect, processing logic may send an HTTP request for a file to an HTTP server over a computer network. Processing logic may receive, from the HTTP server, a signature that is associated with the file, and the file. The file may include at least debug data that is associated with source code for the file and executable code for that file. In some examples, the file includes the source code that is associated with the file, executable code that corresponds to the source code, and debug data associated with the source code and the executable code. Processing logic compares the signature with the file using a digital verification certificate to validate the file. In response to the file being validated, processing logic accepts the file from the HTTP server.

In some examples, in response to the signature not being validated, processing logic rejects the file. In other examples, depending on user settings, the file may be accepted, even if the file fails validation.

In some examples, in response to receiving the HTTP request for the file, the HTTP server obtains the file and the signature from a data package, and sends the file to the client that requested the file as an HTTP response, with the signature being placed in a header of the HTTP response. The data package (e.g., an RPM package) may comprises a plurality of different signatures each being uniquely associated with a corresponding one of a plurality of different files in the data package. The HTTP server may select the signature that corresponds to the requested file, and place it in the header of the HTTP response, with the file (e.g., the payload) being placed in the body of the HTTP response.

The signature may comprise an Integrity Measurement Architecture (IMA) signature that is determined based on applying a private cryptographic key to the file. The digital verification certificate may comprise a public key corresponding to the private cryptographic key. For example, a signor that populates the various data packages may populate a data package with different files and use a cryptographic key to generate the corresponding signature for each of the different files.

In some examples, processing logic may further request and validate a second file from the HTTP server, wherein the file is a first portion of a larger application, and the second file is a second portion of the said larger application. Processing logic may repeat this for each file of interest, and use the obtained debug data to step through the relevant portions of the application.

Some or all the described operations may be performed automatically (e.g., without human input) by processing logic. Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic may perform server-side operations of a debug server, or client-side operations of obtaining and validating a file for debugging, or both.

Figure 1:
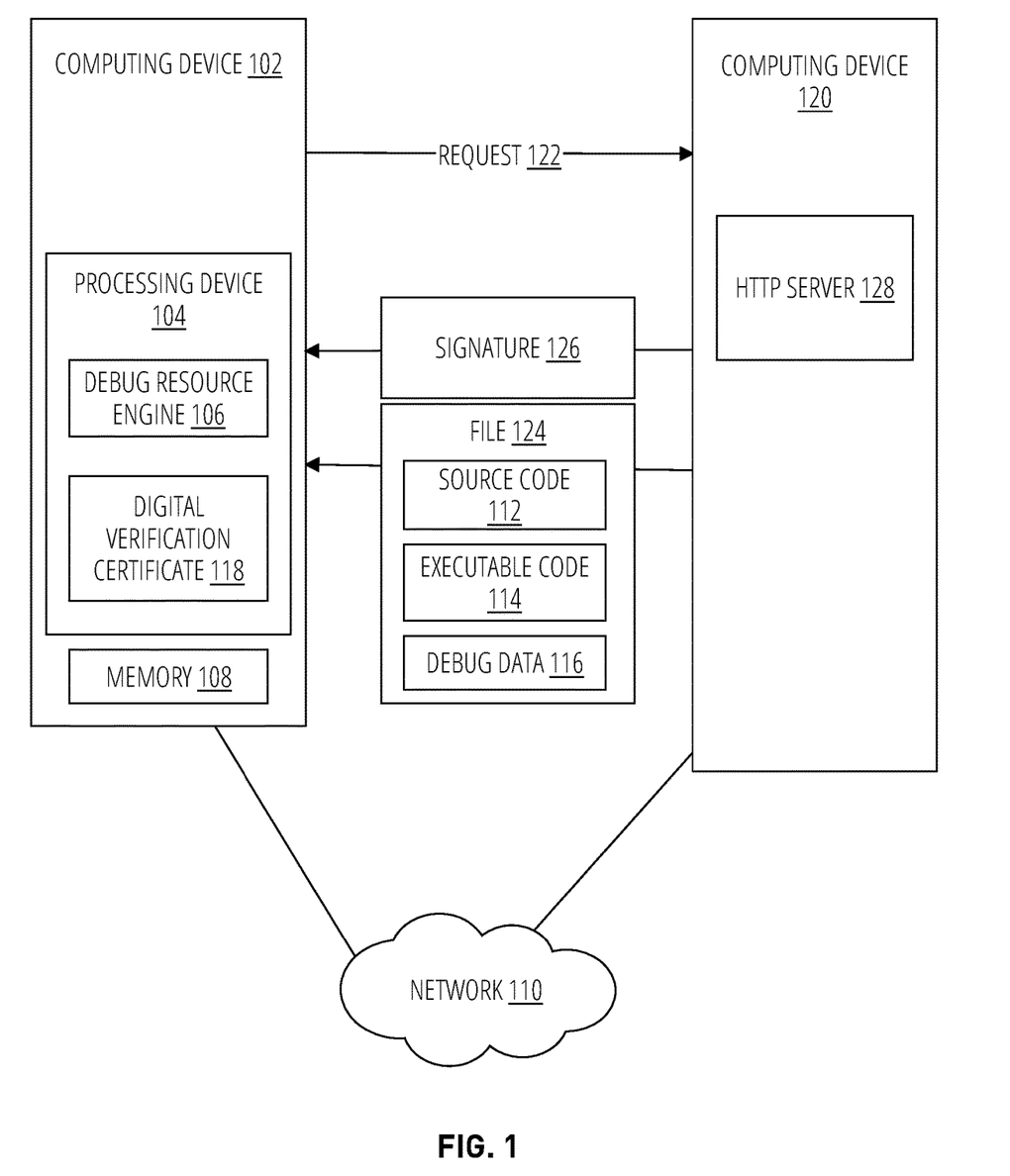
FIG. 1 shows a block diagram of an example computing device that may obtain and validate debug resources on a per-file basis, in accordance with some embodiments.

FIG. 1 shows a block diagram of an example computing device that may obtain and validate debug resources on a per-file basis, in accordance with some embodiments. Computing device 102 includes a processing device 104 and a memory 108. Memory 108 may include volatile memory devices (e.g., random access memory (RAM)), non-volatile memory devices (e.g., flash memory) and/or other types of memory devices. Computing device 102 may include processing logic such as processing device 104. Computing device 120 may comprise a HTTP server 128. Computing device 102 may be referred to as a client device, and computing device 120 may be referred to as a server.

Computing device 102 and computing device 120 may be communicatively coupled over a computer network 110. A computer network 110 may be referred to as a group of interconnected devices (e.g., network components 504, 506, 508) that communicate and share resources with one another. These network devices can include computers, servers, routers, switches, and other networking devices. The communication between devices can be established through wired or wireless connections with a known communication protocol (e.g., TCP/IP, ethernet, Wi-Fi, etc.).

Processing device 104 includes a debug resource engine 106. The debug resource engine 106 may comprise one or more computer programs that run on processing device 104 to perform operations described herein.

Processing device 104 may send an HTTP request 122 for a file 124 to a HTTP server 128 over a computer network 110. Processing device 104 may receive, from the Http server 128, a signature 126 that is associated with the file. Processing device 104 may also receive from the HTTP server 128, the file 124. The file 124 may include at least the debug data 116. For example, file 124 may include source code 112 associated with the file 124, the executable code 114 corresponding to the source code 112, and the debug data 116. Processing device 104 may compare the signature 126 with the file 124 using a digital verification certificate 118 to validate the file 124. In response to the file 124 being validated, processing device 104 may accept the file 124 from the HTTP server 128.

In some examples, in response to the signature not being validated, processing logic rejects the file. In other examples, depending on user settings, the file may be accepted, even if the file fails validation. For example, processing device 104 may comprise one or more user configurable environment variables that the user can modify to accept file 124 even if it fails validation. These environment variables may default to rejecting file 124 if it fails validation.

The signature 126 may be determined based on applying a private cryptographic key to the file. The signature 126 may comprise a hash of the file 124. The digital verification certificate 118 may comprise a public key corresponding to the private cryptographic key used 'sign' the file 124 and generate the signature 126. Validating the file 124 may be performed by applying the digital verification certificate 118 to file and comparing the result to signature 126. If there is a match, then processing device 104 may deem the file 124 to be validated. If the result does not match the signature, then validation of file 124 may be deemed to have failed.

In some examples, processing device 104 may further request and validate one or more additional files (not shown) from the HTTP server. Each file may be a portion of a larger application. For example, the file 124 may be a first portion of a larger application, and a second requested file may represent a second portion of said larger application, and so on. The validation of each file may be performed with the respective signature and respective digital verification certificate, which is typically unique in each case. Processing device 104 may repeat such operations for each file of interest, and use the obtained debug data to step through the relevant portions of the application.

Although shown as integral to processing device 104, in some examples, debug resource engine 106 may be distributed between multiple computing devices, such as over computing device 102 and computing device 120. It should be understood that either computing device 102 or computing device 120, or both, may represent multiple computing devices. The operations that are performed by each device may be distributed accordingly over the multiple computing devices.

Figure 2:
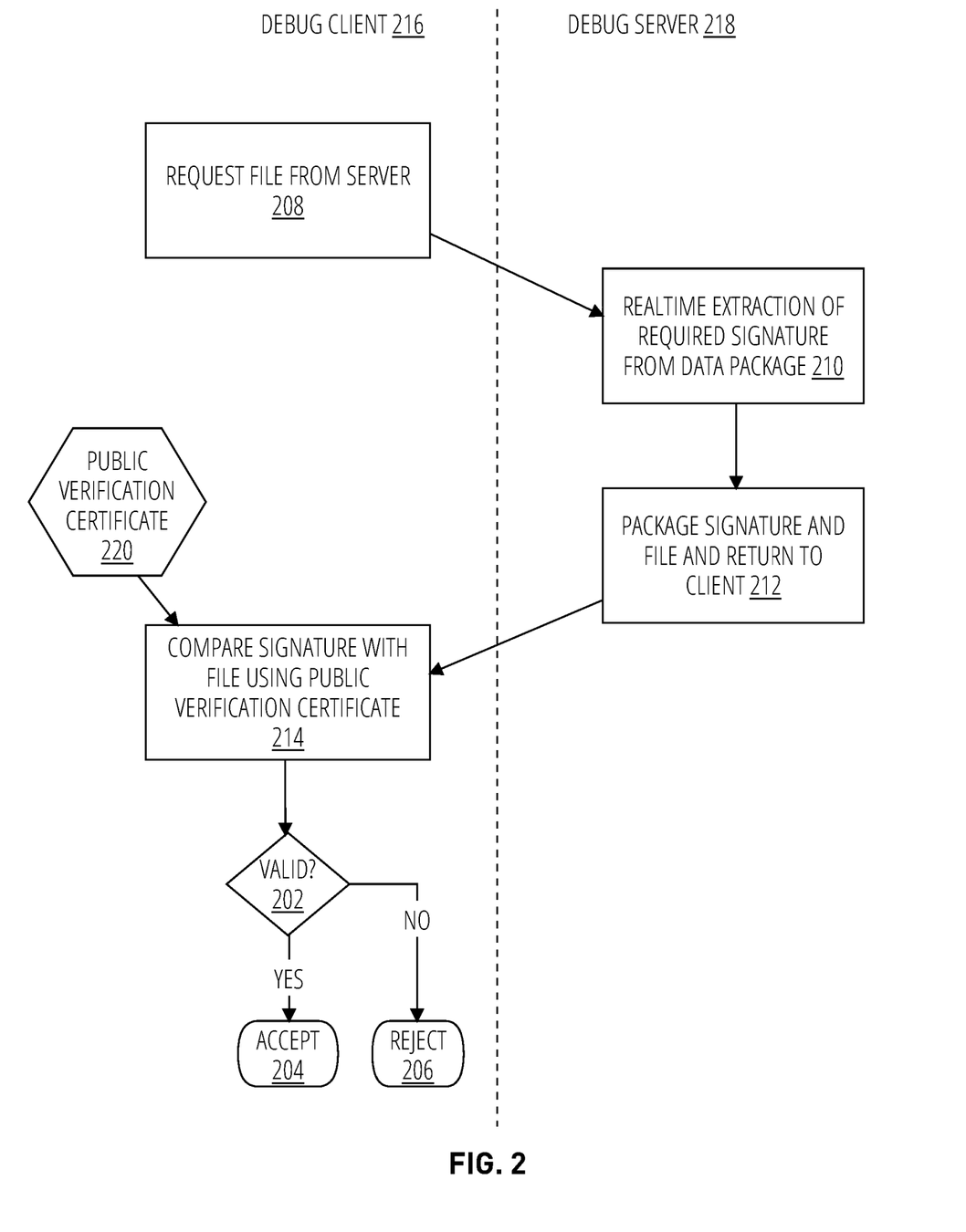
FIG. 2 shows a diagram of an example workflow for validation of debug data on a per-file basis, in accordance with some embodiments.

FIG. 2 shows a diagram of an example workflow for validation of debug data on a per-file basis, in accordance with some embodiments. Some of the operations may be performed on the client side (debug client 216) and some of the operations may be performed on the server side (debug server 218). Some or all the described operations may be performed automatically.

At block 208, the debug client 216 requests a file from debug server 218. The request may include an HTTP request, and HTTPS request, or other request. The request may be made over a computer network.

At block 210, the debug server 218 receives the request and finds the request file, along with the signature of that file. The file and the signature may be found in a data package. The debug server may access the location of the file and signature (e.g., through a database or lookup table), as described further with respect to FIG. 3. With the location, the debug server 218 obtains the requested file and the signature of that file.

At block 212, the debug server 218 packages the file and the signature that corresponds with that file, in a response. The packaged response may be sent through an HTTP response, an HTTPS response, or other response. The debug server 218 sends the response to the debug client 216. The debug server 218 may perform blocks 210 and 212 in real-time, in response to receiving the request from the debug client 216.

At block 214, the debug client 216 may compare the received signature with the received file, using a public verification certificate 220. The public verification certificate 220 may be obtained over a computer network (e.g., from a remote device that manages the certifications). For example, the debug client may simultaneously query a remote device (e.g., a certificate manager) to obtain the public verification certificate 220 that corresponds to the sought after file. With the public verification certificate 220, the debug client 216 may validate the received file as described.

At block 202, if valid, debug client 216 may proceed to block 204 and accept the received file. Debug client 216 may pass the file to another debug tool (not shown). A user may use that debug tool with the file to debug (e.g., step through) the source code of that file. For example, the debug tool may execute the executable code and use the debug data to map execution of the executable code to the human-readable source code. The human-readable source code may be visually shown to the user with visual indications of where the currently executed operation is and the values of one or more variables. Other debugging features may also be performed.

If the file is not valid, the debug client 216 may proceed to block 206 and reject the received file. As mentioned, the user may modify one or more environment variables to override this default behavior and accept the received file, regardless of if it fails validation.

Figure 3:
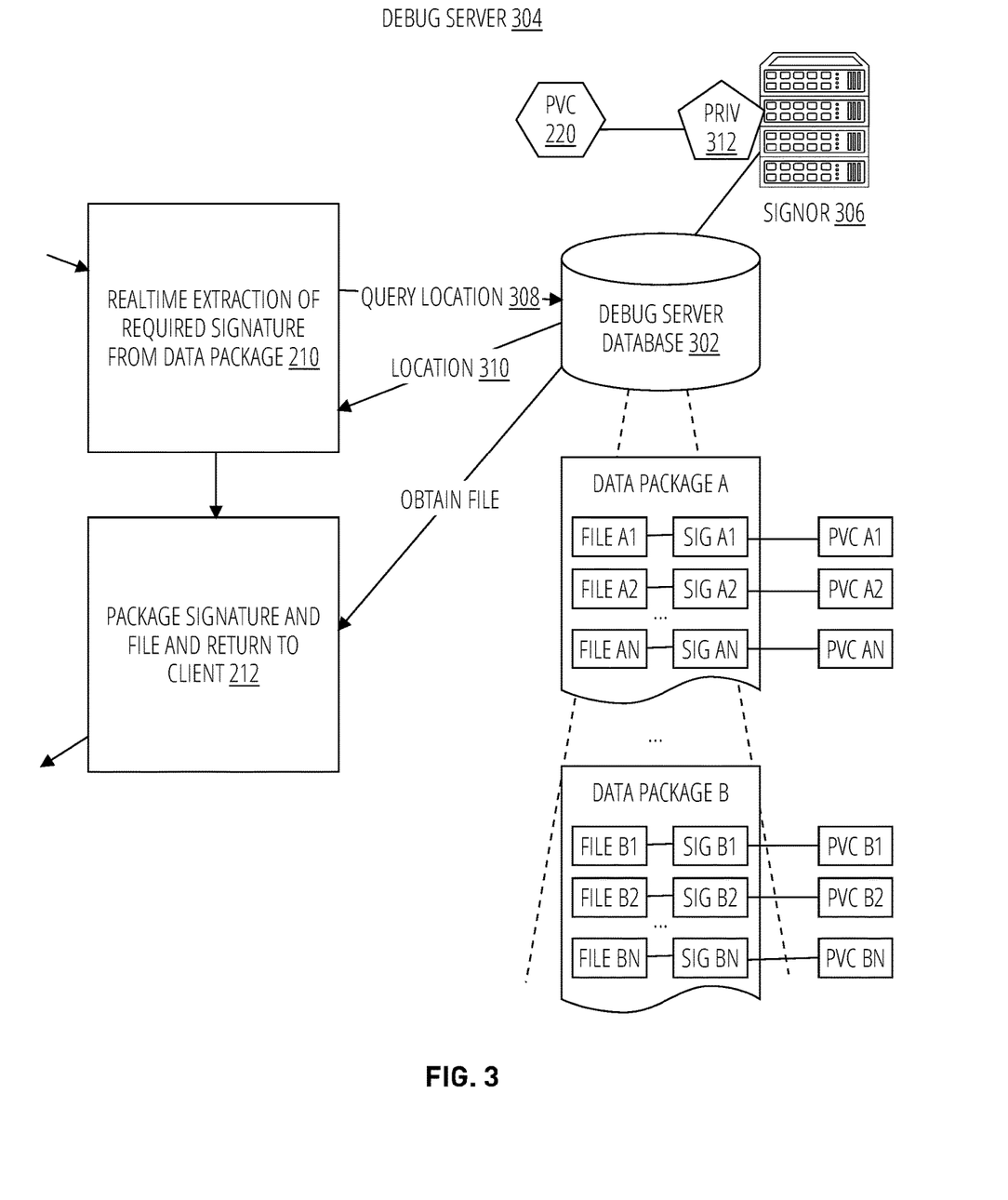
FIG. 3 shows a block diagram and workflow of per-file signatures in a debug environment, in accordance with some embodiments.

FIG. 3 shows a block diagram and workflow of per-file signatures in a debug environment, in accordance with some embodiments. Some or all the described operations may be performed automatically.

As described with respect to FIG. 2, at block 210 the debug server may receive a request for a file. The debug server 218 may, at operation 308, query a debug server database 302 for a location of a data package corresponding to the requested file. The debug server database 302 may, at operation 310, return the location of the requested data package.

The debug server database 302 may store multiple data packages such as data package A, data package B, and so on. Each data package may comprise multiple files and their corresponding signatures. Each file may comprise at least debug data that maps respective source code to corresponding executable code. In some examples, each file includes the source code, the executable code, and the debug data mapping the two.

In some examples, each data package is an RPM package manager (RPM) package. The RPM package manager may also be referred to as Red Hat package manager. RPM packages may contain precompiled software programs and their dependencies, along with installation scripts and metadata. The RPM package may be used by various Linux distribution managers to manage necessary dependencies which are to be installed when a software package is installed. In addition, the RPM package may contain debug information with each file, and a signature for each file, as described.

Debug server database 302 may manage the various data packages (data package A, B, etc.). A signor 306 may sign each file (e.g., file A1, A2, etc.) in each respective data package in the debug server database 302. The signor may use a private key 312 (e.g., a hash algorithm) to sign each file to generate a unique signature (e.g., a hash) for that file. A public verification certificate may be a public key that corresponds to the private key 312 used to sign that file. The public key and the private key may be referred to as a key pair. In some examples, the signor 306 may be integral to debug server 304. In other examples, the signor 306 may comprise one or more remote computing devices.

In some examples, each signature (e.g., SIG A1, SIG A2, SIG AN, SIG B1, SIG B2, SIG BN, etc.) comprises an integrity measurement architecture (IMA) signature. IMA signatures may be digital signatures that are used to verify the integrity of a file or process that has been measured by the IMA subsystem. An IMA signature may be generated using the hash of a file or a process measured by IMA. This signature is then used (e.g., at the client side) to verify that the file or process has not been tampered with or modified since it was originally measured.

At block 212, the debug server 304 may use the location of the data package (obtained through operation 310) to retrieve the file and the signature of that file from the data package at the provided location. Debug server 304 packages the file contents and the signature in a response. The debug server 304 sends the response to the client through a HTTP response, an HTTPS response, or other response message. In aspects described, the term HTTP may be interpreted to include operations that use HTTPS.

Figure 4:
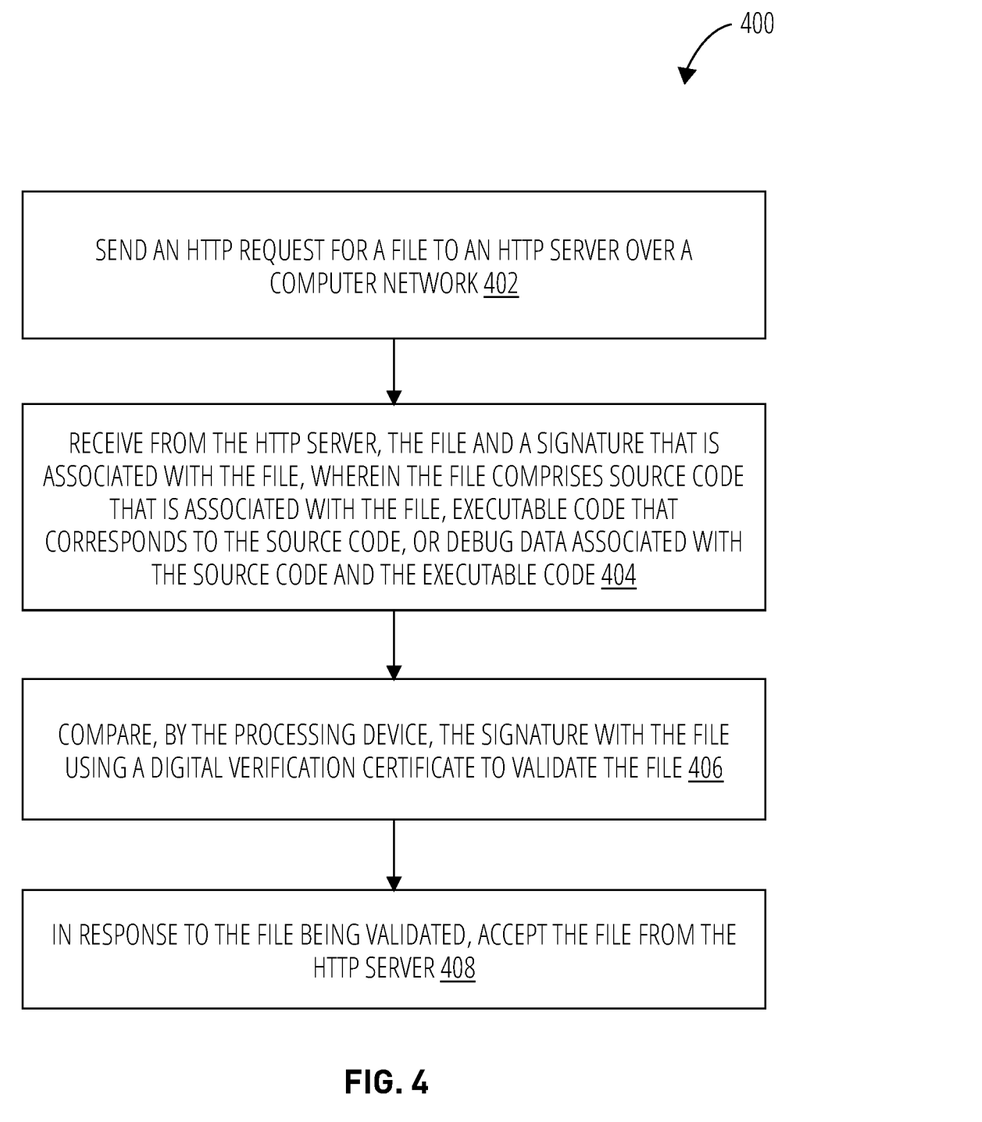
FIG. 4 illustrates an example method for performing client-side validation of debug resources on a per-file basis, in accordance with some embodiments.

FIG. 4 illustrates an example method for performing client-side validation of debug resources on a per-file basis, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 4, method 400 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 400 may be performed in an order different than presented, and that not all of the blocks in the method may be performed.

At block 402, processing logic may send an HTTP request for a file to an HTTP server over a computer network. This request may specify a file by name, ID, or other identification type. The file may correspond to a source code file, multiple source code files, or a library.

At block 404, processing logic may receive, from the HTTP server, a signature that is associated with the file, and the file comprising source code that is associated with the file, executable code that corresponds to the source code, and debug data associated with the source code and the executable code. Alternatively, the file may comprise at least the debug data, and optionally, the source code or the executable code. The debug data may include one or more symbols that map the source code to the executable code, which allows for a debugging tool to trace the source code (e.g., line by line) with the real-time execution of the executable code. Real-time may refer to operations that are performed at the moment, rather than in the past.

At block 406, processing logic may compare, by the processing device, the signature with the file using a digital verification certificate to validate the file. The digital verification certificate may include a public cryptographic key that may be applied to the file to obtain a resulting hash, which can be compared to the signature to see if there is a match.

At block 408, in response to the file being validated, processing logic may accept the file from the HTTP server. The file may be passed to a debug tool to perform debugging of the file such as stepping through the code.

Figure 5:
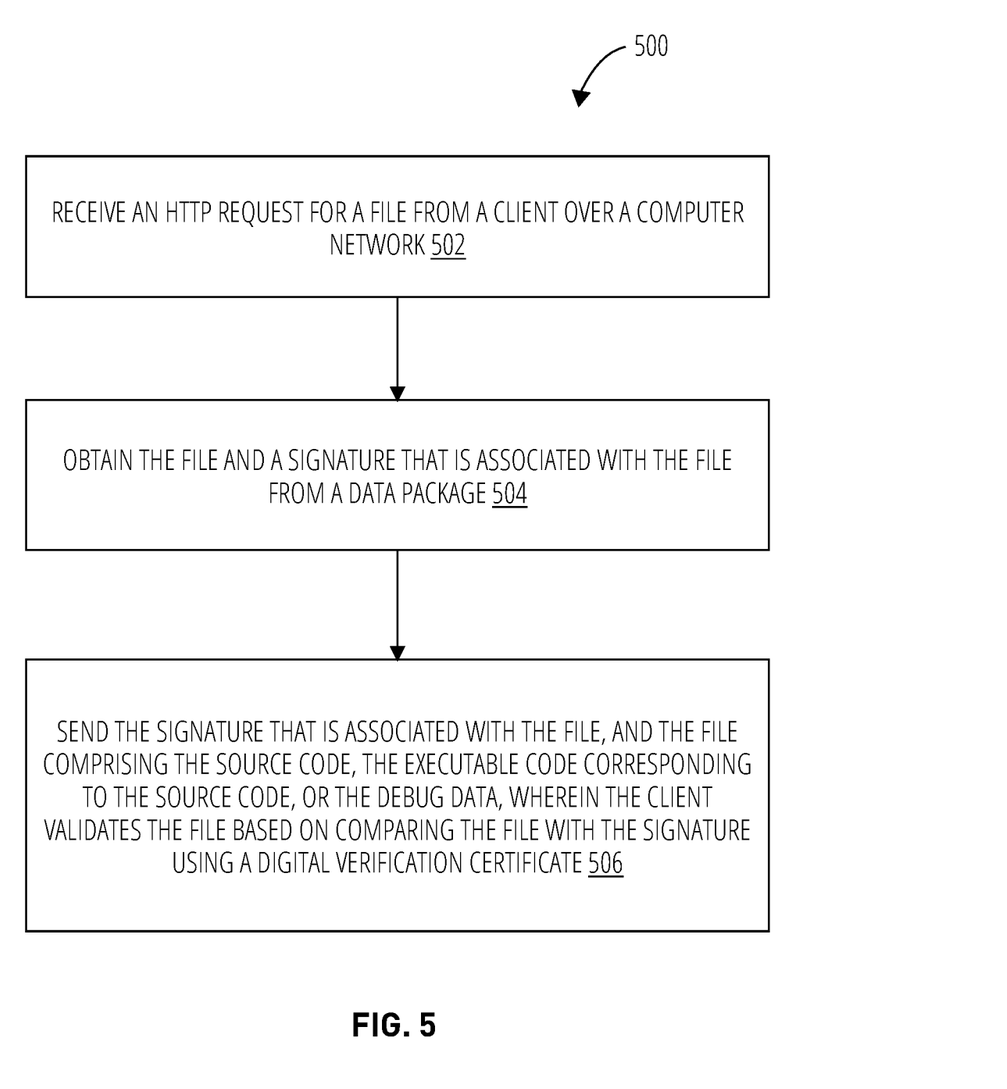
FIG. 5 illustrates an example method for performing server-side support for validation of debug resources on a per-file basis, in accordance with some embodiments.

FIG. 5 illustrates an example method for performing server-side support for validation of debug resources on a per-file basis, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in the method, such blocks are examples. That is, embodiments are well suited to performing various other blocks or variations of the blocks recited in the method. It is appreciated that the blocks in method 500 may be performed in an order different than presented, and that not all of the blocks in the method may be performed.

At block 502, processing logic may receive an HTTP request (or other type of request) for a file from a client over a computer network. The request may specify a name, number, or other identifier for a file.

At block 504 processing logic may obtain the file and a signature that is associated with the file from a data package at block 504. For example, processing logic may perform a lookup to determine which data package has the file, and where the data package is located (e.g., a network address). In the data package, the corresponding signature of each file is also stored. Processing logic may retrieve the file from the data package, with the associated signature.

At block 506, processing logic may send, to the client, the signature that is associated with the file, and the file. The file may comprise the source code, the executable code corresponding to the source code, and the debug data. The client validates the file based on comparing the file with the signature using a digital verification certificate. Alternatively, the file may comprise at least the debug data, and optionally, the source code and the executable code.

Although described separately, method 400, method 500, or both may be performed with debug resource engine 106. Method 400 and 500 may be combined as a method performed at both the client-side and server-side. Either method may include operations that may be distributed over one or more computing devices.

Figure 6:
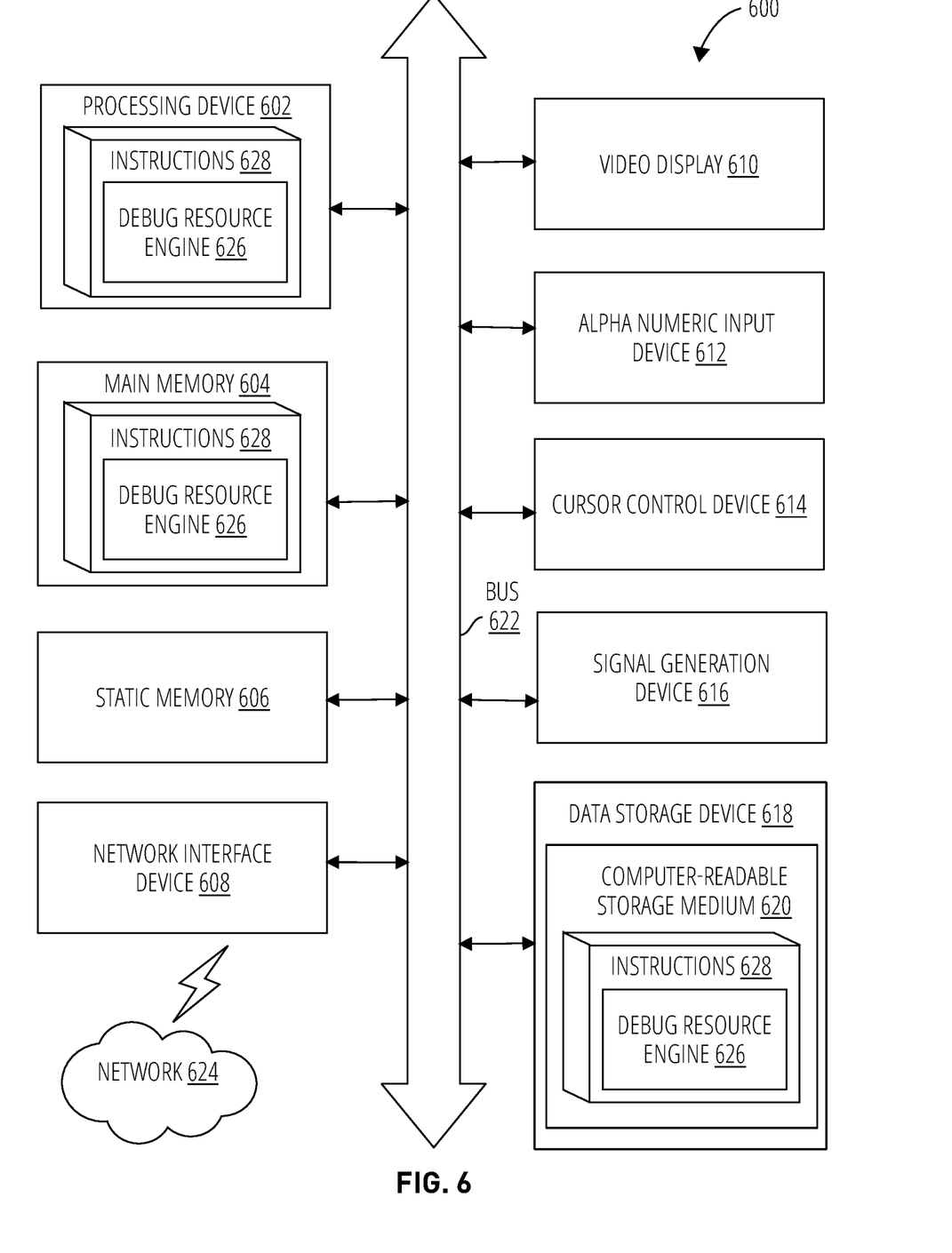
FIG. 6 is a block diagram of an example computing device that may perform one or more of the operations described herein, in accordance with some embodiments.

FIG. 6 is a block diagram of an example computing device 600 that may perform one or more of the operations described herein, in accordance with some embodiments. For example, the computing device 600 may perform one or more operations that obtain and validate debug resources on a per-file basis.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602 (e.g., a general purpose processor, a PLD, etc.), a main memory 604 (e.g., synchronous dynamic random access memory (DRAM), read-only memory (ROM)), a static memory 606 (e.g., flash memory and a data storage device 618), which may communicate with each other via a bus 622.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 624. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 620 on which may be stored one or more sets of instructions 628 that may include instructions for a processing device (e.g., processing device 104), for carrying out the operations described herein, in accordance with one or more aspects of the present disclosure. Instructions 628 may also reside, completely or at least partially, within main memory 604 and/or within processing device 602 during execution thereof by computing device 600, main memory 604 and processing device 602 also constituting computer-readable media. The instructions 628 may further be transmitted or received over a network 624 via network interface device 608. The instructions 628 may contain instructions of a debug resource engine 626 that, when executed, perform the operations and steps discussed herein.

While computer-readable storage medium 620 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 110, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   sending an HTTP request for a file to an HTTP server over a computer network;
   receiving, from the HTTP server, the file and a signature that is associated with the file, wherein the file comprises source code that is associated with the file, executable code that corresponds to the source code, and debug data associated with the source code and the executable code, and wherein the debug data comprises a set of symbols that are generated along with the executable code and indicate information about a variable and a function of the executable code;
   comparing, by a processing device, the signature with the file using a digital verification certificate to validate the file; and
   in response to the file being validated, accepting the file from the HTTP server.

2. The method of claim 1, wherein receiving the file and the signature comprises receiving an HTTP response with the signature in a header of the HTTP response.

3. The method of claim 1, wherein the HTTP request causes the HTTP server to obtain the file and the signature from a data package, and wherein the data package comprises a plurality of different signatures each being uniquely associated with a corresponding one of a plurality of different files in the data package.

4. The method of claim 1, wherein the signature comprises an Integrity Measurement Architecture (IMA) signature that is determined based on applying a private cryptographic key to the file.

5. The method of claim 4, wherein the digital verification certificate comprises a public key corresponding to the private cryptographic key.

6. The method of claim 1, wherein the debug data comprises a mapping of the source code of the file to the corresponding executable code.

7. The method of claim 1, wherein the method further comprises requesting and validating a second file from the HTTP server, wherein the file is a first portion of an application, and the second file is a second portion of the application.

8. The method of claim 1, further comprising, in response to the signature not being validated, rejecting the file.

9. A system comprising:
a memory; and
a processing device operatively coupled to the memory, the processing device to:
send an HTTP request for a file to an HTTP server over a computer network;
receive, from the HTTP server, the file and a signature that is associated with the file, wherein the file comprises source code that is associated with the file, executable code that corresponds to the source code, and debug data associated with the source code and the executable code, and wherein the debug data comprises a set of symbols that are generated along with the executable code and indicate information about a variable and a function of the executable code;
compare, by the processing device, the signature with the file using a digital verification certificate to validate the file; and
in response to the file being validated, accept the file from the HTTP server.

10. The system of claim 9, wherein to receive the file and the signature, the processing device is to receive an HTTP response with the signature in a header of the HTTP response.

11. The system of claim 9, wherein the HTTP request causes the HTTP server to obtain the file and the signature from a data package, and wherein the data package comprises a plurality of different signatures each being uniquely associated with a corresponding one of a plurality of different files in the data package.

12. The system of claim 9, wherein the signature comprises an Integrity Measurement Architecture (IMA) signature that is determined based on applying a private cryptographic key to the file.

13. The system of claim 12, wherein the digital verification certificate comprises a public key corresponding to the private cryptographic key.

14. The system of claim 9, wherein the debug data comprises a mapping of the source code of the file to the corresponding executable code.

15. A non-transitory computer-readable storage medium including instructions that, when executed by a processing device, cause the processing device to:
send an HTTP request for a file to an HTTP server over a computer network;
receive, from the HTTP server, the file and a signature that is associated with the file, wherein the file comprises source code that is associated with the file, executable code that corresponds to the source code, and debug data associated with the source code and the executable code, and wherein the debug data comprises a set of symbols that are generated along with the executable code and indicate information about a variable and a function of the executable code;
compare, by the processing device, the signature with the file using a digital verification certificate to validate the file; and
in response to the file being validated, accept the file from the HTTP server.

16. The non-transitory computer-readable storage medium of claim 15, wherein to receive the file and the signature, the instructions cause the processing device to receive an HTTP response with the signature in a header of the HTTP response.

17. The non-transitory computer-readable storage medium of claim 15, wherein the HTTP request causes the HTTP server to obtain the file and the signature from a data package, and wherein the data package comprises a plurality of different signatures each being uniquely associated with a corresponding one of a plurality of different files in the data package.

18. The non-transitory computer-readable storage medium of claim 15, wherein the signature comprises an Integrity Measurement Architecture (IMA) signature that is determined based on applying a private cryptographic key to the file.

19. The non-transitory computer-readable storage medium of claim 18, wherein the digital verification certificate comprises a public key corresponding to the private cryptographic key.

20. The non-transitory computer-readable storage medium of claim 15, wherein the debug data comprises a mapping of the source code of the file to the corresponding executable code.

* * * * *